(12) United States Patent
Eiselt et al.

(10) Patent No.: US 8,175,464 B2
(45) Date of Patent: *May 8, 2012

(54) CHROMATIC DISPERSION COMPENSATION SYSTEM AND METHOD

(75) Inventors: Michael H. Eiselt, Middletown, NJ (US); Mark Shtaif, Fort Lee, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/179,134

(22) Filed: Jul. 11, 2005

(65) Prior Publication Data

US 2006/0127099 A1    Jun. 15, 2006

Related U.S. Application Data (63) Continuation of application No. 10/147,397, filed on May 15, 2002, now Pat. No. 6,965,738.

(60) Provisional application No. 60/372,845, filed on Apr. 16, 2002.

(51) Int. Cl.
*H04B 10/12* (2006.01)

(52) U.S. Cl. .................... 398/148; 398/147; 398/158

(58) Field of Classification Search ............ 398/46, 398/142, 147, 148, 160, 158
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |
| 5,608,562 A | 3/1997 | Delavaux et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |

(Continued)

FOREIGN PATENT DOCUMENTS

JP    01115230    5/1989

(Continued)

OTHER PUBLICATIONS

United States Patent and Trademark Office: Non-Final Office Action dated Jun. 9, 2005, U.S. Appl. No. 10/454,812, 10 pages.

(Continued)

*Primary Examiner* — Dzung Tran
(74) *Attorney, Agent, or Firm* — Woodcock Washburn LLP

(57) ABSTRACT

Dispersion compensation is provided in an optical transmission system. An optical line couples first and second transceivers, and a plurality of amplifiers coupled to the optical line are spaced throughout the optical line with variable span distances. A plurality of dispersion compensation modules include a coarse granularity fiber, a connector, and a fine granularity fiber. A memory is associated with the dispersion compensators to provide information related to the value of the dispersion compensation.

18 Claims, 5 Drawing Sheets

U.S. PATENT DOCUMENTS

| | | |
|---|---|---|
| 5,877,881 A | 3/1999 | Miyauchi et al. |
| 5,903,613 A | 5/1999 | Ishida |
| 5,914,794 A | 6/1999 | Fee |
| 5,914,799 A | 6/1999 | Tan |
| 5,936,753 A | 8/1999 | Ishikawa |
| 5,940,209 A | 8/1999 | Nguyen |
| 5,963,350 A | 10/1999 | Hill |
| 5,995,694 A | 11/1999 | Akasaka et al. |
| 6,005,702 A | 12/1999 | Suzuki et al. |
| 6,005,997 A | 12/1999 | Robinson et al. ............... 385/24 |
| 6,021,245 A | 2/2000 | Berger et al. |
| 6,038,062 A | 3/2000 | Kosaka |
| 6,043,914 A | 3/2000 | Cook et al. |
| 6,075,634 A | 6/2000 | Casper et al. |
| 6,078,414 A | 6/2000 | Iwano |
| 6,081,360 A | 6/2000 | Ishikawa et al. |
| 6,084,694 A | 7/2000 | Milton et al. |
| 6,088,152 A | 7/2000 | Berger et al. |
| 6,108,074 A | 8/2000 | Bloom |
| 6,122,095 A | 9/2000 | Fatehi |
| 6,151,334 A | 11/2000 | Kim et al. |
| 6,157,477 A | 12/2000 | Robinson |
| 6,160,614 A | 12/2000 | Unno |
| 6,163,392 A | 12/2000 | Condict et al. |
| 6,163,636 A | 12/2000 | Stentz et al. |
| 6,173,094 B1 | 1/2001 | Bowerman et al. |
| 6,177,985 B1 | 1/2001 | Bloom |
| 6,198,559 B1 | 3/2001 | Gehlot |
| 6,229,599 B1 | 5/2001 | Galtarossa |
| 6,236,481 B1 | 5/2001 | Laor |
| 6,236,499 B1 | 5/2001 | Berg et al. |
| 6,246,510 B1 | 6/2001 | BuAbbud et al. |
| 6,259,553 B1 | 7/2001 | Kinoshita |
| 6,259,554 B1 | 7/2001 | Shigematsu et al. |
| 6,259,693 B1 | 7/2001 | Ganmukhi et al. |
| 6,259,845 B1 | 7/2001 | Sardesai |
| 6,272,185 B1 | 8/2001 | Brown |
| 6,275,315 B1 | 8/2001 | Park et al. |
| 6,288,811 B1 | 9/2001 | Jiang et al. |
| 6,307,656 B2 | 10/2001 | Terahara |
| 6,317,231 B1 | 11/2001 | Al-Salameh et al. |
| 6,317,255 B1 | 11/2001 | Fatehi et al. |
| 6,320,687 B1 * | 11/2001 | Ishikawa ..................... 398/147 |
| 6,323,950 B1 | 11/2001 | Kim et al. |
| 6,327,060 B1 | 12/2001 | Otani et al. |
| 6,356,384 B1 | 3/2002 | Islam |
| 6,359,729 B1 | 3/2002 | Amoruso |
| 6,370,300 B1 | 4/2002 | Eggleton et al. |
| 6,393,188 B1 | 5/2002 | Jeong et al. ................. 385/123 |
| 6,396,853 B1 | 5/2002 | Humphrey et al. |
| 6,417,961 B1 | 7/2002 | Sun et al. |
| 6,501,892 B1 | 12/2002 | Okuno et al. .................. 385/127 |
| 6,501,982 B1 | 12/2002 | Ruchti et al. .................. 600/473 |
| 6,504,973 B1 | 1/2003 | DiGiovanni et al. ........... 385/27 |
| 6,519,082 B2 | 2/2003 | Ghera et al. |
| 6,757,468 B2 | 6/2004 | Bickham et al. |
| 6,865,311 B2 | 3/2005 | Li et al. |
| 6,943,935 B2 | 9/2005 | Bickham et al. |
| 6,965,738 B2 * | 11/2005 | Eiselt et al. .................... 398/148 |
| 2001/0005271 A1 | 6/2001 | Leclerc et al. |
| 2001/0007605 A1 | 7/2001 | Inagaki et al. |
| 2001/0009468 A1 | 7/2001 | Fee |
| 2001/0014104 A1 | 8/2001 | Bottorff et al. |
| 2002/0012152 A1 | 1/2002 | Agazzi et al. |
| 2002/0015220 A1 | 2/2002 | Papernyl et al. |
| 2002/0034197 A1 | 3/2002 | Tornetta et al. |
| 2002/0044319 A1 | 4/2002 | Kashima |
| 2002/0044324 A1 | 4/2002 | Hoshida et al. |
| 2002/0048287 A1 | 4/2002 | Silvers |
| 2002/0051468 A1 | 5/2002 | Ofek et al. |
| 2002/0063948 A1 | 5/2002 | Islam et al. |
| 2002/0064181 A1 | 5/2002 | Ofek et al. |
| 2002/0075903 A1 | 6/2002 | Hind |
| 2002/0080809 A1 | 6/2002 | Nicholson et al. |
| 2002/0159119 A1 * | 10/2002 | Fries et al. .................... 359/161 |
| 2003/0026533 A1 | 2/2003 | Danziger et al. |
| 2003/0047524 A1 * | 3/2003 | Sato et al. ........................ 211/1 |
| 2004/0042067 A1 | 3/2004 | Eiselt |
| 2004/0208607 A1 | 10/2004 | Eiselt et al. |

FOREIGN PATENT DOCUMENTS

JP    02238736    9/1990

OTHER PUBLICATIONS

United States Patent and Trademark Office: Non-Final Office Action dated Nov. 18, 2005, U.S. Appl. No. 10/454,812, 9 pages.

United States Patent and Trademark Office: Non-Final Office Action dated May 15, 2006, U.S. Appl. No. 10/454,812, 9 pages.

United States Patent and Trademark Office: Non-Final Office Action dated Jan. 25, 2007, U.S. Appl. No. 10/454,812, 8 pages.

United States Patent and Trademark Office: Final Office Action dated Sep. 6, 2007, U.S. Appl. No. 10/454,812, 9 pages.

United States Patent and Trademark Office: Non-Final Office Action dated Jan. 17, 2007, U.S. Appl. No. 11/515,480, 6 pages.

United States Patent and Trademark Office: Final Office Action dated Sep. 6, 2007, U.S. Appl. No. 11/515,480, 6 pages.

* cited by examiner

CHROMATIC DISPERSION COMPENSATION SYSTEM AND METHOD

CROSS-REFERENCE TO RELATED APPLICATIONS

This application is a continuation application Ser. No. 10/147,397 Filed May 15, 2002, Now of U.S. Pat. No. 6,965,738, issued Nov. 15, 2005, which claims benefit under 35 U.S.C. 119(e) of U.S. Provisional Patent Application No. 60/372,845, filed Apr. 16, 2002, each of which is hereby incorporated by reference in its entirety. This application is related by subject matter to U.S. patent application Ser. No. 10/454,812, filed Jun. 3, 2003, and to U.S. patent application Ser. No. 11/515,480, filed Aug. 31, 2006.

TECHNICAL FIELD

This invention relates to a dispersion compensation system and more particularly to a chromatic dispersion compensation system for use in optical transmission systems.

BACKGROUND

The transmission, routing and dissemination of information has occurred over computer networks for many years via standard electronic communication lines. These communication lines are effective, but place limits on the amount of information being transmitted and the speed of the transmission. With the advent of light-wave technology, a large amount of information is capable of being transmitted, routed and disseminated across great distances at a high transmission rate over fiber optic communication lines.

When information is transmitted over fiber optic communication lines, impairments to the pulse of light carrying the information can occur including pulse broadening (dispersion) and attenuation (energy loss). As an optical signal is transmitted over the fiber optic communication line, the optical signal is transmitted at various frequencies for each component of the optical signal. The high frequency components move through the fiber optic material at different speeds then compared to the low frequency components. Thus, the time between the faster components and the slower components increase as the optical signal is transmitted over the fiber optic communication line. When this occurs, the pulse broadens to the point where it interferes with the neighboring pulses; this is known as chromatic dispersion. Chromatic dispersion compensation corrects this pulse broadening. Various chromatic dispersion compensation apparatus and methods are available. In U.S. Pat. No. 6,259,845 entitled "Dispersion Compensating Element Having an Adjustable Dispersion" issued to Harshad P. Sardesai, a variable dispersion compensation module is disclosed. In the Sardesai patent, a dispersion compensation module including segments of optical fiber of varying lengths, some of which have a positive dispersion while others have a negative dispersion is disclosed. Selected optical fiber segments are coupled to one another to provide a desired net dispersion to offset the dispersion associated with the fiber optic communication line. The Sardesai patent allows for this variable dispersion compensation model rather than provide a unique segment of dispersion compensation fiber for each span. The Sardesai dispersion compensation module functions by interconnecting the various length of various dispersion per kilometer fibers so that the resulting total dispersion equals the dispersion of the fiber optic communication line span. The Sardesai dispersion compensation module, however, has a high cost in that multiple dispersion compensation fibers enclosed within the Sardesai compensation module may remain unused and are therefore wasted when implemented in the field. Further, the Sardesai dispersion compensation module requires excessive interconnectivity between the various dispersion compensation fibers, allowing for a greater connection loss to be experienced.

U.S. Pat. No. 6,275,315 entitled "Apparatus for Compensating for Dispersion of Optical Fiber in an Optical Line" issued to Park, et al. discloses a dispersion compensation method in which dispersion compensation fiber is used in conjunction with a variable dispersion module. In the Park patent, the variable dispersion compensation module is a dispersion compensation filter such as a reflective etalon filter. The etalon filter is a tunable filter and thus allows for variable dispersion compensation.

The primary focus of the fiber optic industry to correct chromatic dispersion has followed one of two paths. The first path was for the use of variable dispersion compensation modules as has been disclosed in the above referenced patent/patent applications. A second path is to manufacture dispersion compensation fibers in varying lengths to correct for dispersion compensation. Each varying length of the dispersion compensation fiber must be inventoried requiring a vast amount of assets to be tied up in inventory which is infrequently implemented. Therefore, any advancement in the ability to reduce the number of interconnectivity points between the dispersion compensating fibers and to reduce the cost incurred with the highly technical variable dispersion compensators and the high cost of inventory would be greatly appreciated.

SUMMARY

A dispersion compensation system and method for use in an optical transmission system to compensate for signal distortion of an optical signal is provided. The dispersion compensation system includes a first and second transceivers for generating and receiving the optical signal respectively. An optical line couples the first transceiver to the second transceiver. A plurality of amplifiers are coupled to the optical line, spaced periodically throughout the optical line forming span distances, wherein the amplifiers amplify the optical signal and wherein the span distances are variable. A plurality of dispersion compensation modules are coupled to the plurality of amplifiers wherein the dispersion compensation models include a coarse granularity module having a resolution of at least 5 kilometers coupled to a connector. The connector is also coupled to a fine granularity module having a resolution of one kilometer. The coarse and fine granularity modules are connected through a single connector. The coarse granularity modules and the fine granularity modules correct the dispersion of the optical signal accumulated in the variable span distance.

BRIEF DESCRIPTION OF THE DRAWINGS

A better understanding of the invention can be obtained from the following detailed description of one exemplary embodiment as considered in conjunction with the following drawings in which.

DETAILED DESCRIPTION OF ILLUSTRATIVE EMBODIMENTS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figures 1, 4A:
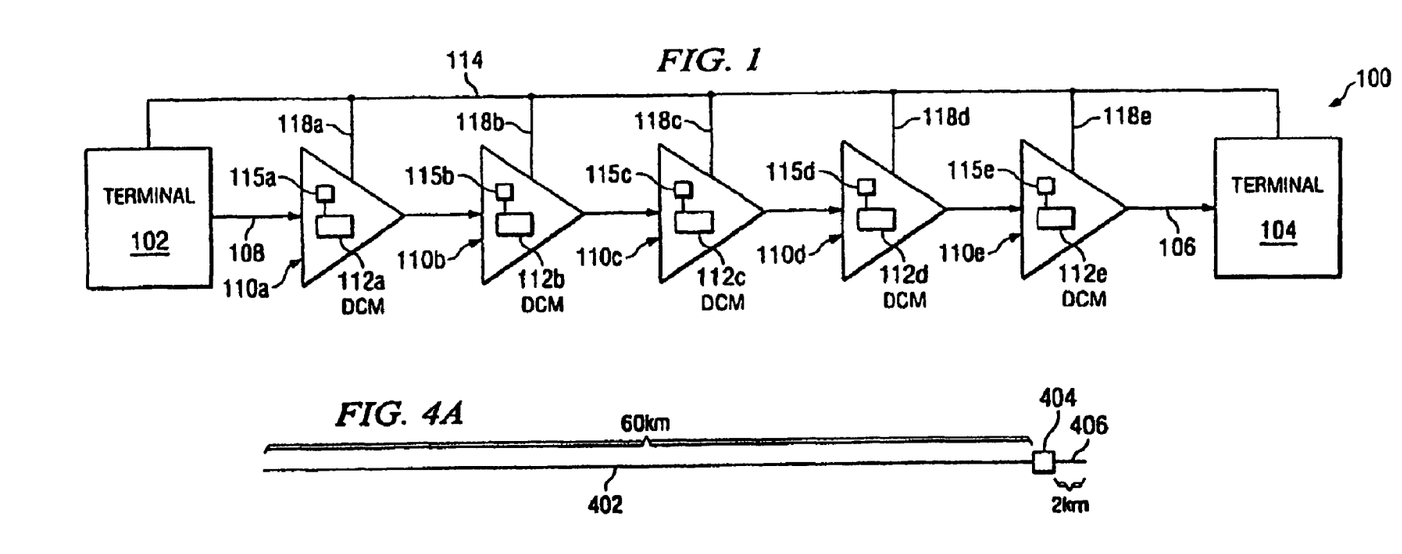
FIG. 1 is a block diagram depicting an optical transmission system according to the present invention.
FIG. 4a is a block diagram depicting exemplary fiber combinations according to the present invention.
Figure 2A:
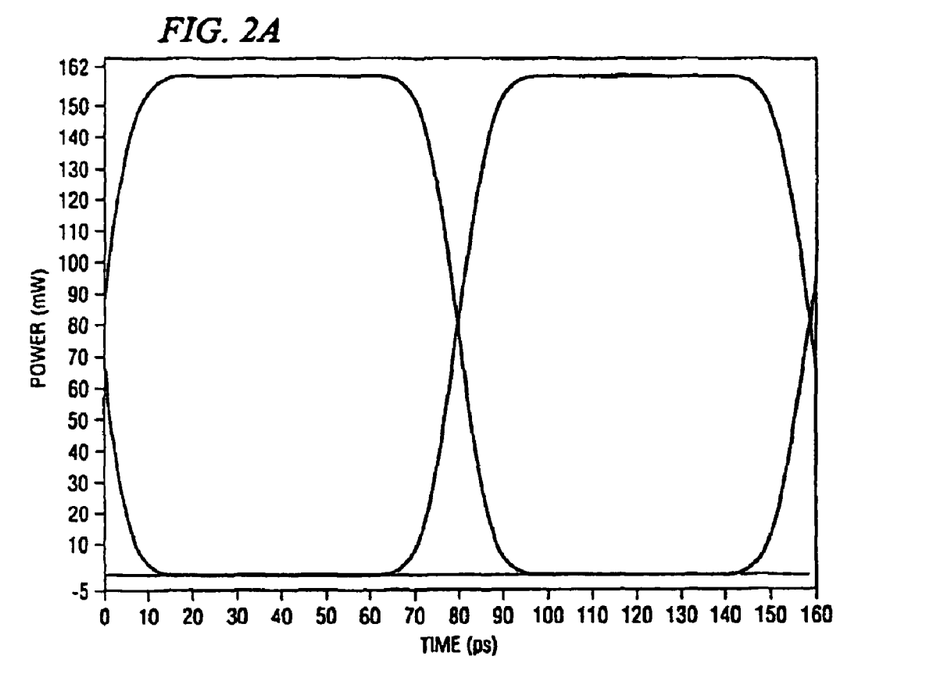
FIGS. 2a, 2b, 2c, 2d are graphical representations of an eye diagram of the optical signal.
Figure 2B:
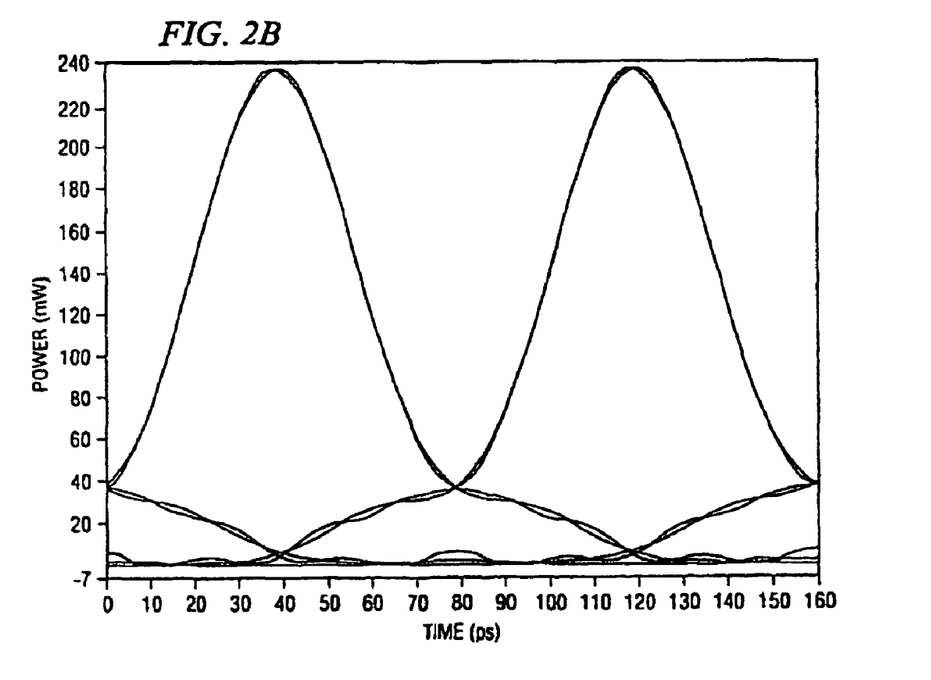
Figure 2C:
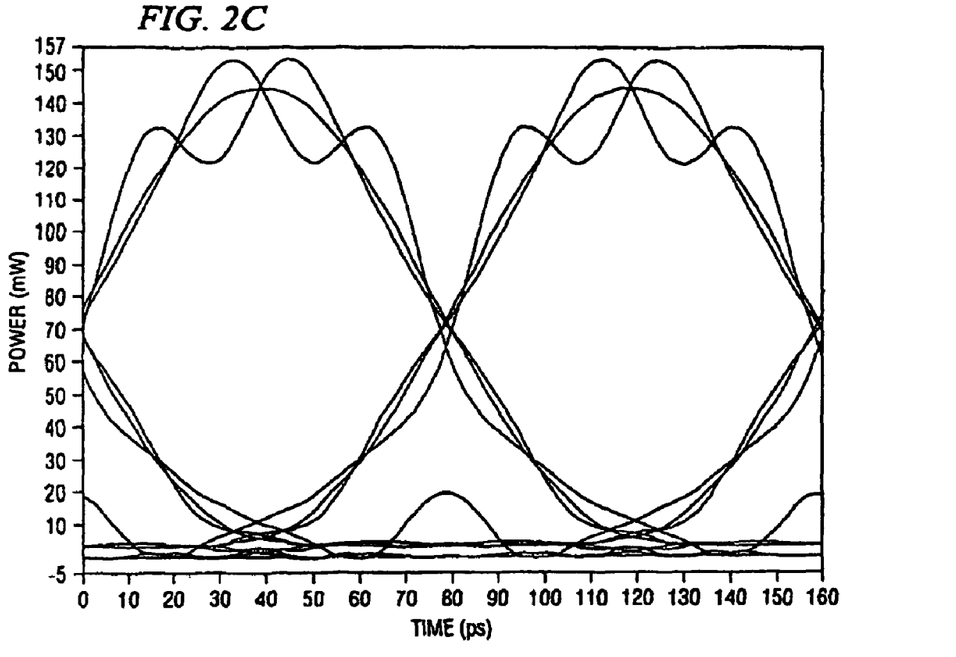
Figure 2D:
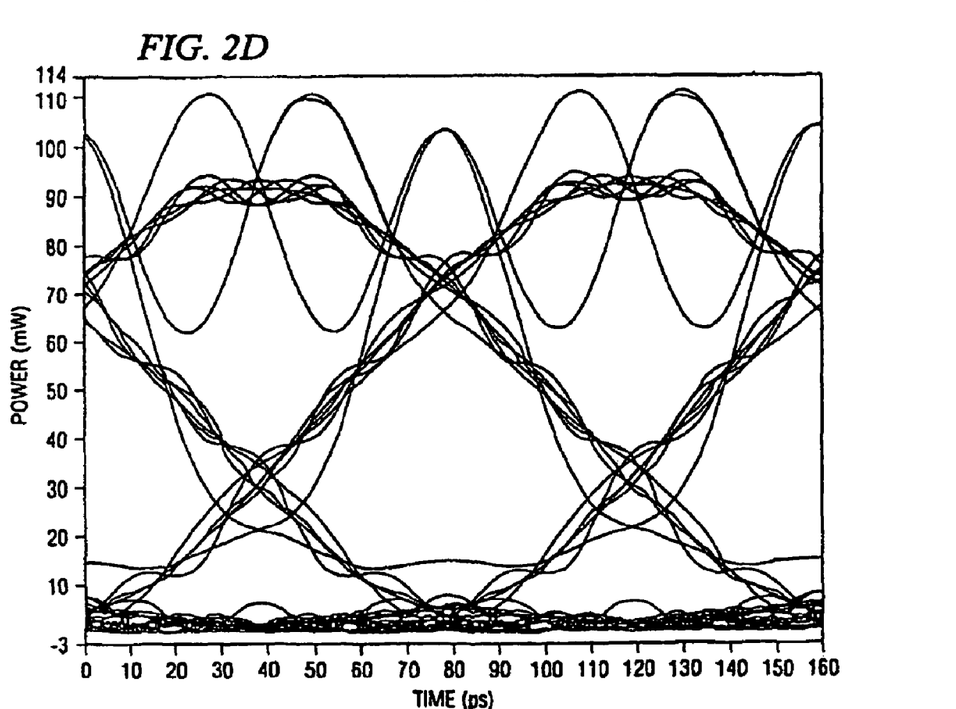

FIG. 1 depicts an optical transmission system according to the present invention. An optical transmission system 100 is shown including a transmitting terminal 102 and a receiving terminal 104. For illustrative purposes only, the optical transmission system 100 is shown in a unidirectional manner. However, as is known to those skilled in the art, the optical transmission system 100 can function in a bi-directional manner without detracting from the spirit of the invention. The transmitting terminal 102 and the receiving terminal 104 are connected through optical line 106. An optical signal 108 is transmitted over the optical line 106. Spaced periodically throughout the optical transmission system 100 are in-line amplifiers 110. The in-line amplifiers 110 boost the optical signal 108 as it is transmitted over the optical line 106. As the optical signal 108 is transmitted over the optical line 106, the optical signal 108 begins to experience chromatic dispersion. Chromatic dispersion is the broadening of the optical pulse over the various frequencies of the components of the optical signal 108. High frequency components of the optical signal move through the optical line 106 at a different speed when compared to the low frequency components of the optical signal 108. The longer wave-length components move at a slower rate than the shorter wave-length components of the optical signal 108. Therefore, the optical signal 108 pulse broadens over time as the optical signal is transmitted throughout the optical line 106. Chromatic dispersion compensation is necessary to correct for this pulse broadening impairment.

A controller 115 is resident in each in-line amplifier 110 and connects the in-line amplifiers 110(a-e) to the optical supervisory channel 114 through transmission lines 118(a-e). The controllers 115(a-e) receive and transmit control data for the in-line amplifiers 110(a-e). The controller in one embodiment includes a processor, a mass storage device, a network connection and a memory (all not shown). However, a wide range of controllers are implementable without detracting from the spirit of the invention.

A dispersion compensation module 112 is coupled to the in-line amplifiers 110 such that the optical signal 108 flows through the dispersion compensation module 112 as the optical signal 108 is transmitted along the optical line 106. The dispersion compensation modules 112(a-e) are electronically coupled to the controllers 115(a-e) and receive control data from the optical supervisory channel 114 through transmission lines 118(a-e) via the controllers 115(a-e). As can be seen, dispersion compensation modules 112(a-e) are located at each in-line amplifier 110(a-e) location in the optical transmission system 100. However, the quantity of dispersion compensation modules may be varied, including locating dispersion compensation modules at every other in-line amplifier or by selecting a fixed number of dispersion compensation modules and distributing those dispersion compensation modules at fixed intervals through the optical transmission system, without detracting from the spirit of the invention. Thus, in one embodiment, a dispersion compensation module 112a is shown co-located with in-line amplifier 110a within the optical transmission system 100. The distance between the transmitting terminal 102 and the first in-line amplifier 110a and the distances between a first in-line amplifiers 110 and an adjacent amplifier 110 may vary according to the physical layout of the optical transmission system 100. Thus, the frequency of the in-line amplifiers 110 within the optical transmission system 100 may vary depending upon the type of fiber used in the optical line 106 and depending upon the physical terrain that the optical transmission system 100 must span. The distances between the transmitting terminal 102 and the first in-line amplifier 110a, the distances between adjacent in-line amplifiers 110 and the distances between the receiving terminal 104 and the last in-line amplifier 110e may vary and each distance defined is a spanned distance.

Referring now to FIG. 2, graphical representations of the eye diagram of the optical signal are shown. As the optical signal 108 is transmitted over a standard optical system, a optimal pulse shape is initially transmitted. The optimal pulse shape can be seen in FIG. 2a. The optimal pulse shape forms an "eye" and represents the minimum amount of chromatic dispersion of the optical signal 108 pulse. As the optical signal 108 is transmitted over the optical transmission network 100, the pulse begins to broaden as is shown in FIGS. 2b and 2c. As the pulse broadens, the distinctions between separate optical signal 108 pulses become less discernable. As the optical signal 108 is transmitted further along the optical line 106, the optical signal 108 continues to broaden as is shown in FIG. 2d. Thus, as the optical signal 108 is transmitted over the optical line 106, the optical signal 108 broadens to a point in which the information being transmitted over the optical signal 108 is no longer discernable. Thus, the optical signal 108 requires a chromatic dispersion correction to maintain an adequate "eye" or pulse shape.

Figure 3:
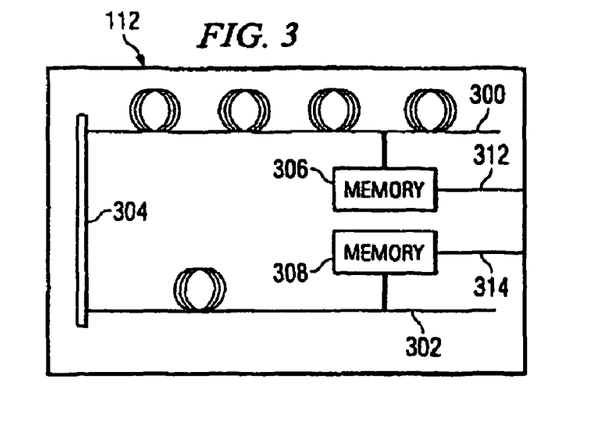
FIG. 3 is a block diagram depicting a dispersion compensation module according to the present invention.

Referring now to FIG. 3, the dispersion compensation module according to the present invention is shown. Current dispersion compensation methodologies which incorporate dispersion compensation fibers can be classified in two groups. The first methodology includes the use of a dispersion compensation fiber in combination with a tunable dispersion compensation filter. The tunable compensation filter allows for the fine tuning of the dispersion compensation module to be accomplished when the exact amount of dispersion over a span is not known. Thus, when in the field, the installer can adjust through the interconnection of multiple dispersion compensation fibers within the tunable dispersion compensation module to accomplish the level of dispersion compensation necessary to offset the chromatic dispersion present in the current span. Examples of this methodology include U.S. Pat. No. 6,259,845 and U.S. Patent Application No. US2001/0009468 discussed herein. A second methodology requires that the exact dispersion amount of the span be calculated and then a single piece dispersion compensation fiber that exactly matches this specific dispersion amount be manufactured or obtained from a current inventory and installed to offset the chromatic dispersion of the span. A third methodology now exists and is discussed herein.

The dispersion compensation module 112 according to the present invention is comprised of a coarse granularity fiber 300 and a fine granularity fiber 302 interconnected with connector 304. The coarse granularity fiber 300 compensates for the dispersion slope of the fiber and includes multiple dispersion compensation devices such as dispersion compensating fiber, higher order mode devices and chirped fiber bragg gratings. The fine granularity fiber 302 includes dispersion compensating fiber, higher order mode devices and chirped fiber bragg gratings but further includes the use of a standard single mode fiber (SSMF). The connector 304 is of the type commonly known to those skilled in the art for the connection of dispersion compensation fibers.

A memory 306 is physically coupled to the coarse granularity fiber 300 and is coupled to the controller 115 through communication line 312. A second memory 308 is physically coupled to the fine granularity fiber 302 and is coupled to the controller 115 through communication line 314. The memories 306 and 308, in one embodiment, are programmable read-only memories, preferably electronically erasable programmable read-only memories. However, multiple memory systems are implementable without detracting from the spirit of the invention. Unique identifiers are stored in the memories 306 and 308 and upon a query from the controller 115, the unique identifiers are transmitted to the controller 115 for retransmission across the optical supervisory channel 114. Further, the unique identifiers are ascertainable through direct electrical connection to the in-line amplifier 110 as would occur by maintenance personnel in the field. The unique identifiers allow the maintenance personnel to identify the specific coarse and fine granularity fibers 300 and 302 installed in the dispersion compensation module 112. Upon visual inspection, the resolution of the coarse and fine granularity fibers 300 and 302 is difficult to ascertain. However, if each individual fiber or each resolution or length of the coarse and fine granularity fibers 300 and 302 are assigned unique identifiers, the maintenance personnel only need cross reference the unique identifier with a master list to distinctly identify the resolution of the coarse and fine granularity fibers 300 and 302. The coarse and fine granularity fibers 300 and 302 are manufactured at specific lengths, then inventoried such that through the use of only one coarse granularity fiber, one fine granularity fiber and one connector the dispersion accumulated in any standard span, which typically has a range of less than 100 kilometers, can be compensated. In one embodiment of the present invention, the coarse granularity fibers 300 are manufactured and inventoried at lengths which correspond to the accumulated dispersion in the optical network 100 for lengths of 10 kilometers, 20 kilometers, 30 kilometers, 40 kilometers, 50 kilometers, 60 kilometers, 70 kilometers, 80 kilometers, 90 and 100 kilometers. The fine granularity fibers 300 are manufactured and inventoried at lengths which correspond to the accumulated dispersion in the optical network 100 for lengths of 1 kilometer, 2 kilometers, 3 kilometers, 4 kilometers, 5 kilometers, 6 kilometers, 7 kilometers, 8 kilometers and 9 kilometers. Therefore for any span under 109 kilometers, the dispersion compensation module according to one embodiment of the present invention is implemented with only one coarse granularity fiber 300, one fine granularity fiber 302 and one connector 304. In another embodiment of the present invention, the coarse granularity fibers 300 are manufactured and inventoried at lengths which correspond to the accumulated dispersions in the optical network 100 for lengths of 5 kilometers, 10 kilometers, 15 kilometers, 20 kilometers, 25 kilometers, 30 kilometers, 35 kilometers, 40 kilometers, 45 kilometers, 50 kilometers, 55 kilometers, 60 kilometers, 65 kilometers, 70 kilometers, 75 kilometers, 80 kilometers, 85 kilometers, 90 kilometers, 95 kilometers, 100 kilometers. The fine granulated fibers 300 are manufactured and inventoried at lengths which correspond to the accumulated dispersion in the optical network for lengths of −5 kilometer, −4 kilometer, −3 kilometer, −2 kilometer, −1 kilometer, 1 kilometer, 2 kilometers, 3 kilometers, 4 kilometers, 5 kilometers. Therefore, for any span under 105 kilometers, the dispersion compensation model according to one embodiment of the present invention is implemented with only coarse granularity fiber 300, one fine granularity fiber 302 and one connector 304. The benefits of such systems are the reduction of manufacturing costs, the reduction of inventory costs and the reduction of time necessary to identify and install the dispersion compensation module 112.

In one prior art system in which a single dispersion compensation fiber is used to offset the chromatic dispersion associated with any variable span under 109 kilometers, 109 different dispersion compensation fiber lengths would be necessary to offset the chromatic dispersion accumulated in various lengths varying from 1 to 109 kilometers. According to the present invention, only 19 various dispersion compensation fiber lengths would be necessary to be manufactured and inventoried. In another prior system, a tunable dispersion compensation module is attached to varying lengths of dispersion compensation fiber. However, the cost of the tunable dispersion compensation modules greatly exceed the cost of the dispersion compensation fiber itself and a tunable dispersion compensation module is necessary for each span. Further, the tunable dispersion compensation modules require multiple connections between various lengths of dispersion compensation fibers within the tunable dispersion module and therefore incur a greater amount of loss due to each of these multiple connections. As can be seen, the present invention provides a simplified and cost effective method of preparing a dispersion compensation module 112 as shown.

The dispersion compensation module 112 may be assembled in the field if the installer carries at least one each of the various lengths of the dispersion compensation fiber according to the present invention. Alternatively, the dispersion compensation module 112 may be assembled at the plant if the chromatic dispersion of the specific span is known. The dispersion compensation module 112 is then delivered and installed in the optical network by a field technician.

Figures 4B, 4C:
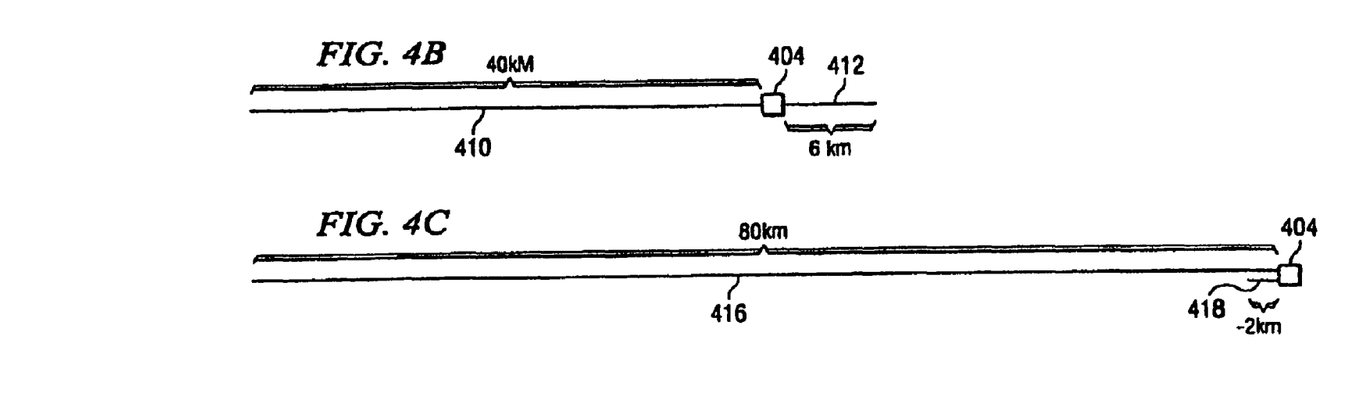
FIG. 4b is a block diagram depicting exemplary fiber combinations according to the present invention.
FIG. 4c is a block diagram depicting exemplary fiber combinations according to the present invention.

Referring now to FIGS. 4a, 4b and 4c, exemplary block diagrams are provided showing the various coarse and fine granularity fibers interconnected. FIGS. 4a through 4c demonstrate various exemplary embodiments of the dispersion compensation module. In FIG. 4a, a dispersion compensation module 112 is shown with a coarse granularity fiber 402 equivalent to 60 kilometers of accumulated dispersion connected through connector 404 to a fine granularity fiber 406 equivalent to the dispersion necessary for the accumulation of 2 kilometers of dispersion. Therefore, through the use of the single coarse granularity fiber 402, the connector 404, and the fine granularity fiber 406 the total dispersion accumulated in 62 kilometers of the optical line 106 can be compensated. In FIG. 4b, another exemplary embodiment is shown with the coarse granularity fiber 410 equivalent to 40 kilometers of accumulated dispersion, connected through connector 404 with the fine granularity fiber 412 equivalent to 6 kilometers of accumulated dispersion. Therefore, in this example, the dispersion associated with 46 kilometers has been offset through the use of the single coarse granularity fiber 410, fine granularity fiber 412 and a connector 404. In FIG. 4c, an alternative embodiment is shown. The coarse granularity fiber 416 is equivalent to the accumulated dispersion of 80 kilometers. The coarse granularity fiber 416 is connected through connector 404 to a fine granularity fiber 418 of an accumulated −2 kilometers. The −2 kilometer fine granularity fiber 418 is typically a standard single mode fiber (SSMF). The fine granularity fiber 418 is used to compensate for the over compensation of the coarse granularity fiber 416. Therefore, in this example, the total distance to be compensated is 78 kilometers. To accomplish this, the 80 kilometer coarse granularity fiber 416 was coupled to a −2 kilometer fine granularity fiber 418. The benefits of this compensation for over compensation of the coarse granularity fiber include: lower connection losses due to the connection of the SSMF to the coarse granularity fiber 416 where the large connector losses are experienced between the connection of two dispersion compensation fibers; a lower power loss is experienced as a signal flows through the SSMF as compared to dispersion compensation fiber; and the SSMF is a lower cost than the standard dispersion compensation fiber. Other fiber types such as non-zero dispersion shifted fiber and silica-core fiber may be implemented as the negative fine granularity fiber without detracting from the spirit of the invention.

The dispersion compensation module 112 may include one device including the coarse granularity fiber and the fine granularity fiber, two different sub-modules, one for the coarse granularity fiber and one for the fine granularity fiber, or the fine granularity fiber may be integrated into the coarse granularity fiber through connectors or splices at manufacture. A wide range of connection possibilities exist without detracting from the spirit of the invention.

Figure 5:
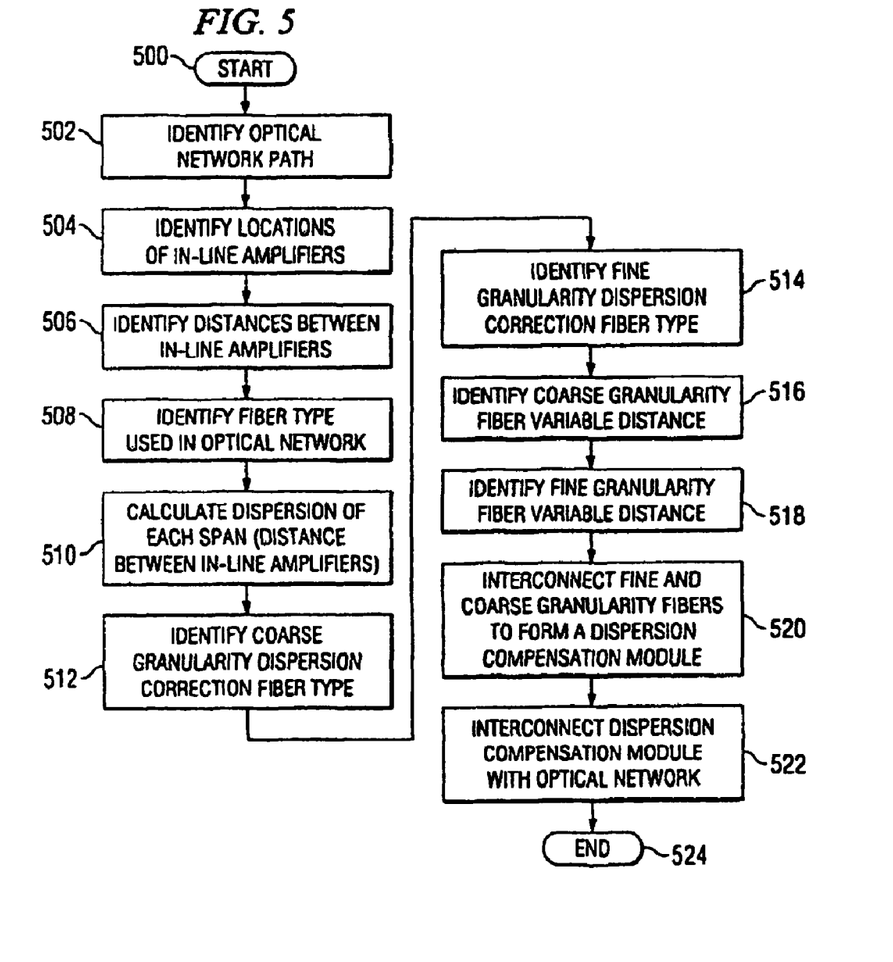
FIG. 5 is a flow chart of the dispersion compensation method according to the present invention.

FIG. 5 is a flow diagram of the dispersion compensation method according to the present invention. The process begins with start 500. Next, in step 502, the physical optical network path is identified. The developers of the optical network system identify the route in which the optical network path will take over the physical terrain. Next, the locations for the in-line amplifiers 110 are identified in step 504. The location of these in-line amplifiers 110 depend upon the physical terrain and the characteristics of the optical network. Next, in step 506, the various distances between the in-line amplifiers 110, the distance between the transmitting terminal 102 and the first inline amplifier 110a, and the distance between the last in-line amplifier 110e and the receiving terminal 104 are identified. As these distances vary, the determination of the specific span distance for each span is necessary to determine the accumulated dispersion over that span. Next, in step 508, the specific fiber type which will be used in the optical network is identified. Once this optical fiber type has been identified, the specific characteristics of this fiber are measured or obtained and will be used to determine the amount of dispersion per kilometer of the optical network. The calculation to determine the dispersion for each span in the optical network is accomplished in step 510. This dispersion calculation depends on the specific span distances and the fiber type and characteristics of the fiber selected. In an alternative embodiment, the measurement equipment will be taken out into the field to directly measure the dispersion amount of the particular deployed span. In this embodiment, the accuracy of the dispersion is higher, as dispersion even in the same fiber type might differ among different production batches and the product of span length and average dispersion might give a less accurate result. Once the calculated accumulated dispersion for each span is determined, the coarse granularity fiber type is identified in step 512. The fine granularity fiber type is identified next in step 514. The fiber types are selected based upon the characteristics of the optical network fiber and are selected based upon the dispersion calculations for each span. Next, in step 516, the coarse granularity fiber variable distances are determined. In one embodiment, the coarse granularity fiber variable distances are based upon 10 kilometer groupings. Therefore, the coarse granularity fiber variable distances are 10 kilometers, 20 kilometers, 30 kilometers, 40 kilometers, etc. The fine granularity fiber variable distances are identified in step 518. These fiber variable distances depend upon the total dispersion amount experienced over the optical network and may depend upon the current manufacturing or inventory of specific variable distances. The variable distances are determined such that one coarse granularity fiber and one fine granularity fiber are coupled to properly compensate for the accumulated dispersion of any span distance in the optical network, thus reducing inventory and cost levels. Next, in step 520, the fine and coarse granularity fibers are intercoupled to form a dispersion compensation module 112. The dispersion compensation module may be formed in the field, interconnected at a assembly facility, or may be connected at manufacturer if the manufacturer has access to the specific variable distances. Finally, in step 522, the dispersion compensation module is coupled to the optical network to compensation for the chromatic dispersion accumulated in each span. The process ends with step 524.

Figure 6:
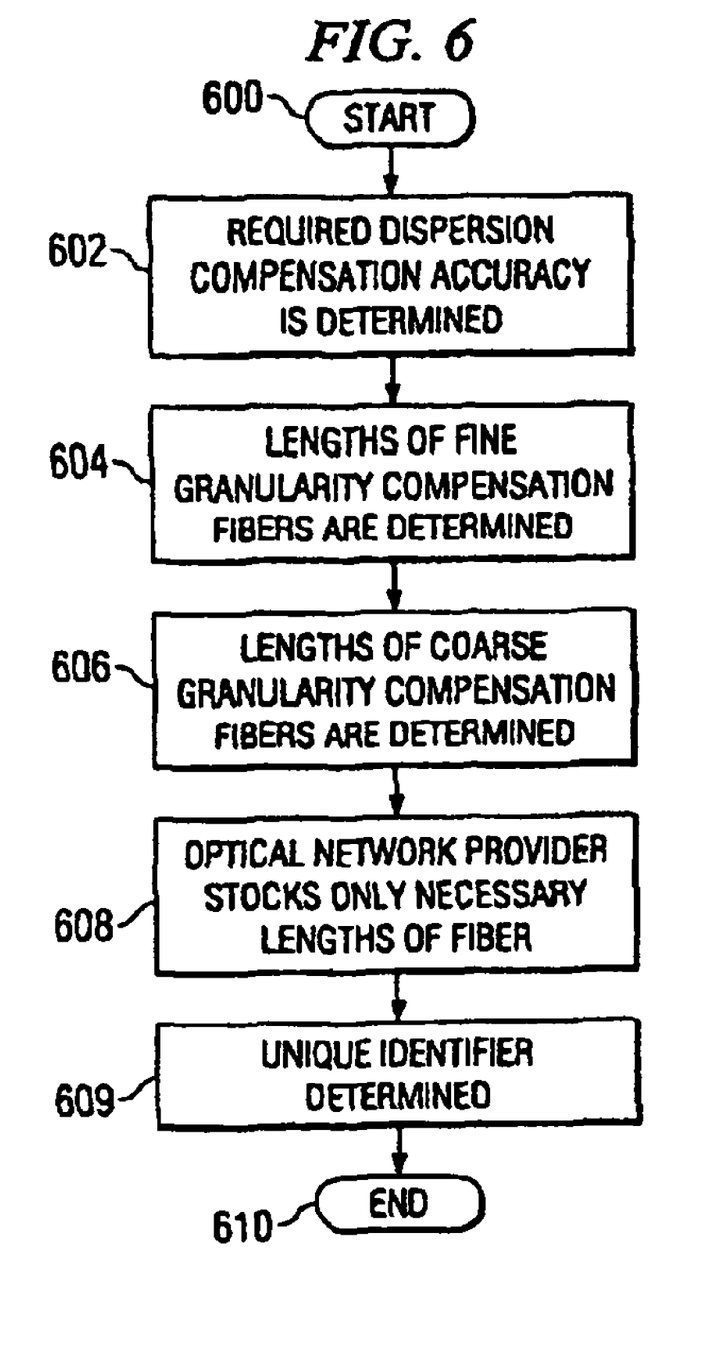
FIG. 6 is a flow chart depicting the inventory reduction of dispersion compensation fibers method according to the present invention.

Referring now to FIG. 6, a method of inventory reduction of dispersion compensation fibers is shown. The process begins with start 600. Next, in step 602, the required dispersion compensation accuracy is determined on a per span basis based upon transmission system modeling. Next, in step 604, the lengths of the fine granularity compensation fibers are determined based upon the required compensation accuracy per span as determined in step 602. Next, in step 606, the lengths of the coarse granularity fibers are determined based upon the maximum length of the fine granularity fibers and the range of dispersion that needs to be compensated. For the lowest overall number of different fiber modules, the number of coarse and fine granularity fibers should be approximately equal. The necessary lengths are determined such that only one coarse and only one fine granularity fiber can be coupled to compensate any standard span distance. In one embodiment, the standard span distance is less than 109 kilometers. In another embodiment, the necessary lengths of the coarse granularity fibers are based upon 10 kilometer increments and the fine granularity fibers are based upon 1 kilometer increments. In another embodiment, the fine granularity fiber compensate from a −9 kilometers to a +9 kilometers. Next, in step 608, the optical network provider stocks only the necessary lengths of the coarse and fine granularity fibers. Thus, the intermittent lengths are not manufactured or inventoried and thus the inventory is reduced thus lowering costs of manufacture and storage. In step 609 the unique identifiers for the coarse and fine granularity fibers 300 and 302 are determined. A unique identifier is assigned to each individual fiber or a unique identifier is assigned to a specific length or resolution of the coarse and fine granularity fibers 300 and 302. The unique identifier is stored in a memory device 306 and 308 and is physically attached to the individual fibers. The manufactured and stored coarse and fine granularity fibers 300 and 302 can be electronically polled and an automatic inventory listing determined. The process ends with step 610.

The foregoing disclosure and description of the invention are illustrative and explanatory thereof of various changes to the size, shape, materials, components and order may be made without departing from the spirit of the invention.

What is claimed is:

1. A method of forming a dispersion compensation module for dispersion compensation in an optical transmission system, the method comprising:

selecting a coarse granularity fiber from a fiber inventory, wherein the fiber inventory comprises coarse granularity fibers and fine granularity fibers which are each configured to provide a fixed amount of dispersion compensation, and wherein the fixed amount of dispersion compensation provided by each fiber in the fiber inventory is chosen such that combinations of one coarse granularity fiber and one fine granularity fiber span a range of possible dispersion values in the optical transmission system;

selecting a fine granularity fiber from the fiber inventory; and optically coupling the coarse granularity fiber and the fine granularity fiber to one another.

2. The method of claim 1, further comprising coupling the coarse granularity fiber and the fine granularity fiber to an in-line amplifier in the optical transmission system.

3. The method of claim 1, wherein the optically coupling occurs upon deployment in the field.

4. The method of claim 1, wherein the optically coupling occurs prior to deployment in the field.

5. The method of claim 1, further comprising coupling a first memory device to the coarse granularity fiber.

6. The method of claim 5, further comprising coupling a second memory device to the fine granularity fiber.

7. The method of claim 6, further comprising:
storing a first unique identifier associated with the coarse granularity fiber in the first memory device; and
storing a second unique identifier associated with the fine granularity fiber in the second memory device.

8. The method of claim 1, wherein the selecting the coarse granularity fiber comprises selecting the coarse granularity fiber to overcompensate for dispersion of an optical signal.

9. The method of claim 8, wherein the selecting the fine granularity-fiber comprises selecting the fine granularity fiber to compensate for the overcompensation of the coarse granularity fiber.

10. The method of claim 1, wherein the fine granularity fiber comprises a standard single mode fiber.

11. The method of claim 1, wherein the fine granularity fiber comprises a non-zero dispersion shifted fiber.

12. The method of claim 1, wherein the fine granularity fiber comprises a silica core fiber.

13. The method of claim 1, wherein the coarse granularity fibers in the fiber inventory have a resolution of at least about 10 km.

14. The method of claim 1, wherein the fine granularity fiber has a negative resolution.

15. The method of claim 1, wherein the coarse granularity fibers in the fiber inventory are each configured to compensate for a fixed amount of accumulated dispersion in the optical transmission system corresponding to lengths in the range of about 10 km to about 100 km.

16. The method of claim 15, wherein the fine granularity fibers in the fiber inventory are each configured to compensate for a fixed amount of accumulated dispersion in the optical transmission system corresponding to lengths in the range of about 1 km to about 9 km.

17. The method of claim 1, wherein the coarse granularity fibers in the fiber inventory are each configured to compensate for a fixed amount of accumulated dispersion in the optical transmission system corresponding to lengths in the range of about 5 km to about 100 km.

18. The method of claim 17, wherein the fine granularity fibers in the fiber inventory are each configured to compensate for a fixed amount of accumulated dispersion in the optical transmission system corresponding to lengths in the range of about −5 km to about 5 km.

* * * * *

UNITED STATES PATENT AND TRADEMARK OFFICE
CERTIFICATE OF CORRECTION

| | | |
|---|---|---|
| PATENT NO. | : 8,175,464 B2 | |
| APPLICATION NO. | : 11/179134 | |
| DATED | : May 8, 2012 | |
| INVENTOR(S) | : Eiselt et al. | |

It is certified that error appears in the above-identified patent and that said Letters Patent is hereby corrected as shown below:

In Column 1, Line 8, delete "Filed May 15, 2002, Now of" and insert -- filed May 15, 2002, now --, therefor.

In Column 10, Line 2, in Claim 9, delete "granularity-fiber" and insert -- granularity fiber --, therefor.

Signed and Sealed this
Fourteenth Day of August, 2012

David J. Kappos
*Director of the United States Patent and Trademark Office*